United States Patent [19]
Kondo et al.

[11] Patent Number: 5,825,104
[45] Date of Patent: Oct. 20, 1998

[54] SMALL LINEAR MOTOR TABLE

[75] Inventors: Takuo Kondo; Shoji Fujisawa; Norimitsu Kitade, all of Kanagawa, Japan

[73] Assignee: Nippon Thompson Co., Ltd., Tokyo, Japan

[21] Appl. No.: 805,351

[22] Filed: Feb. 24, 1997

[30]     Foreign Application Priority Data

Mar. 28, 1996  [JP]  Japan ................................. 8-099400

[51] Int. Cl.$^6$ .................................................. H02K 41/02
[52] U.S. Cl. ................................................................ 310/12
[58] Field of Search ................................. 310/12, 13, 14

[56]          References Cited

U.S. PATENT DOCUMENTS

| | | | |
|---|---|---|---|
| 5,317,222 | 5/1994 | Neff et al. ................................. | 310/13 |
| 5,359,245 | 10/1994 | Takei ........................................ | 310/12 |
| 5,637,945 | 6/1997 | Yamamuro et al. .................... | 310/268 |

*Primary Examiner*—Clayton E. Laballe
*Assistant Examiner*—Judson H. Jones
*Attorney, Agent, or Firm*—Sughrue, Mion, Zinn, Macpeak & Seas, PLLC

[57]          ABSTRACT

The present invention discloses a compact and inexpensive linear motor table. The above effects of the present invention are achieved by allowing at least one of either the bed or table to also serve as the yoke, or the magnetic circuit portion, of a linear electromagnetic actuator in addition to its inherent function.

11 Claims, 12 Drawing Sheets

SMALL LINEAR MOTOR TABLE

BACKGROUND OF THE INVENTION

1. Field of the Invention

The present invention relates to a single-axis positioning table apparatus equipped on, for example, a machine tool or industrial robot, that positions and guides an object (driven object) with high accuracy, and more particularly, to a linear motor positioning table apparatus equipped with a linear electromagnetic actuator for its drive source (hereinafter to be referred to simply as a linear motor table).

2. Description of the Prior Art

In recent years, linear motion positioning tables that perform positioning by guiding linear motion have come to be widely used accompanying the growth and development of the electronics industry. As a result, applications for linear motor tables using a linear electromagnetic actuator in place of a ball screw and so forth for the drive source have increased accompanying demands for higher operating speeds.

There is currently a trend towards the development of said linear motor tables for the purpose of reducing the size and cost of industrial robots and other equipment in which they are to be incorporated.

SUMMARY OF THE INVENTION

In consideration of the above-mentioned factors, the object of the present invention is to provide a compact and inexpensive linear motor table.

In addition, the present invention also provides a linear motor table that also demonstrates other effects.

In order to achieve the above-mentioned object, the linear motor table of the present invention is equipped with a bed and table incorporated so as to freely and mutually perform relative motion, and a linear electromagnetic actuator that provides driving force between the above-mentioned bed and table, either of the above-mentioned bed or table serving as the magnetic circuit portion of the above-mentioned linear electromagnetic actuator.

In addition, each of the following constitutions are employed to obtain various other effects.

Namely, in the linear motor table of the present invention, the above-mentioned linear electromagnetic actuator in the above-mentioned constitution is composed of a linear direct current motor having an armature coil group and a field magnet, its primary side being fixed to the above-mentioned bed, having a detection device for detecting the relative positions of the above-mentioned bed and table, and said detection device being composed of a detected portion attached to the above-mentioned table and a detecting portion installed on the above-mentioned bed.

Moreover, in the above-mentioned linear motor table, a guiding device is provided that performs relative guidance of the above-mentioned bed and table, said guiding device being composed of track members in which tracks are formed along the lengthwise direction, sliders that are riding on said track members in which rolling element circulating paths are formed corresponding to said tracks, and rolling elements arranged and contained within said rolling element circulating paths.

In addition, in the above-mentioned linear motor table, restricting members are provided on both ends of the above-mentioned bed that restrict the movement of the above-mentioned table, said restricting members being fixed on a work bench and so forth.

Next, in the above-mentioned linear motor table, power is supplied to the above-mentioned linear direct current motor and the above-mentioned detecting portion centralized at a single location which is led to the outside.

In addition, the above-mentioned linear motor table has a drive substrate for supplying power and so forth to the above-mentioned armature coils, said armature coils and drive circuits provided on said drive substrate being grouped into units that are arranged by connecting a multiple number into a single unit, thus enabling the above-mentioned drive substrate to be divided by separating the individual armature coil and drive circuit units from other individual armature coil and drive current units.

In addition, in the above-mentioned linear motor table, an empty space is provided at a prescribed location on the above-mentioned drive substrate, with the circuit of the above-mentioned detecting portion being arranged in said empty space.

Moreover, the above-mentioned linear motor table has a gap adjustment device that adjusts the gap between the above-mentioned detecting portion and detected portion.

In addition, in the above-mentioned linear motor table, the above-mentioned drive substrate is also used as a cover.

In addition, in the above-mentioned linear motor table, the above-mentioned detecting portion and detected portion are arranged on mutually opposing portions of the above-mentioned bed and table.

DESCRIPTION OF THE PREFERRED EMBODIMENTS

Next, the following provides an explanation of the preferred embodiments of the present invention while referring to the attached drawings.

Figure 1:
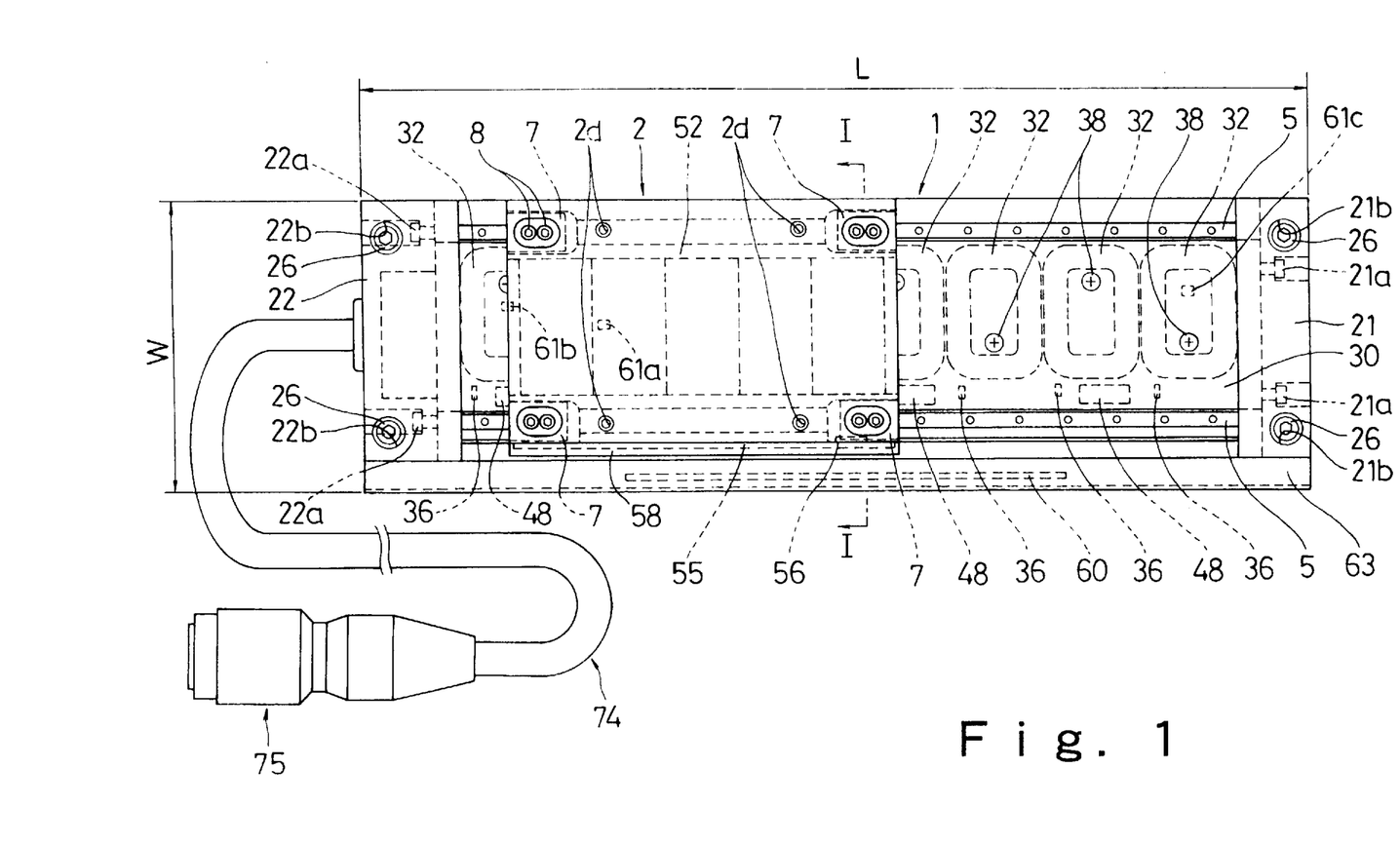
FIG. 1 is an overhead view of a small linear motor table as a first embodiment of the present invention.
Figure 2:
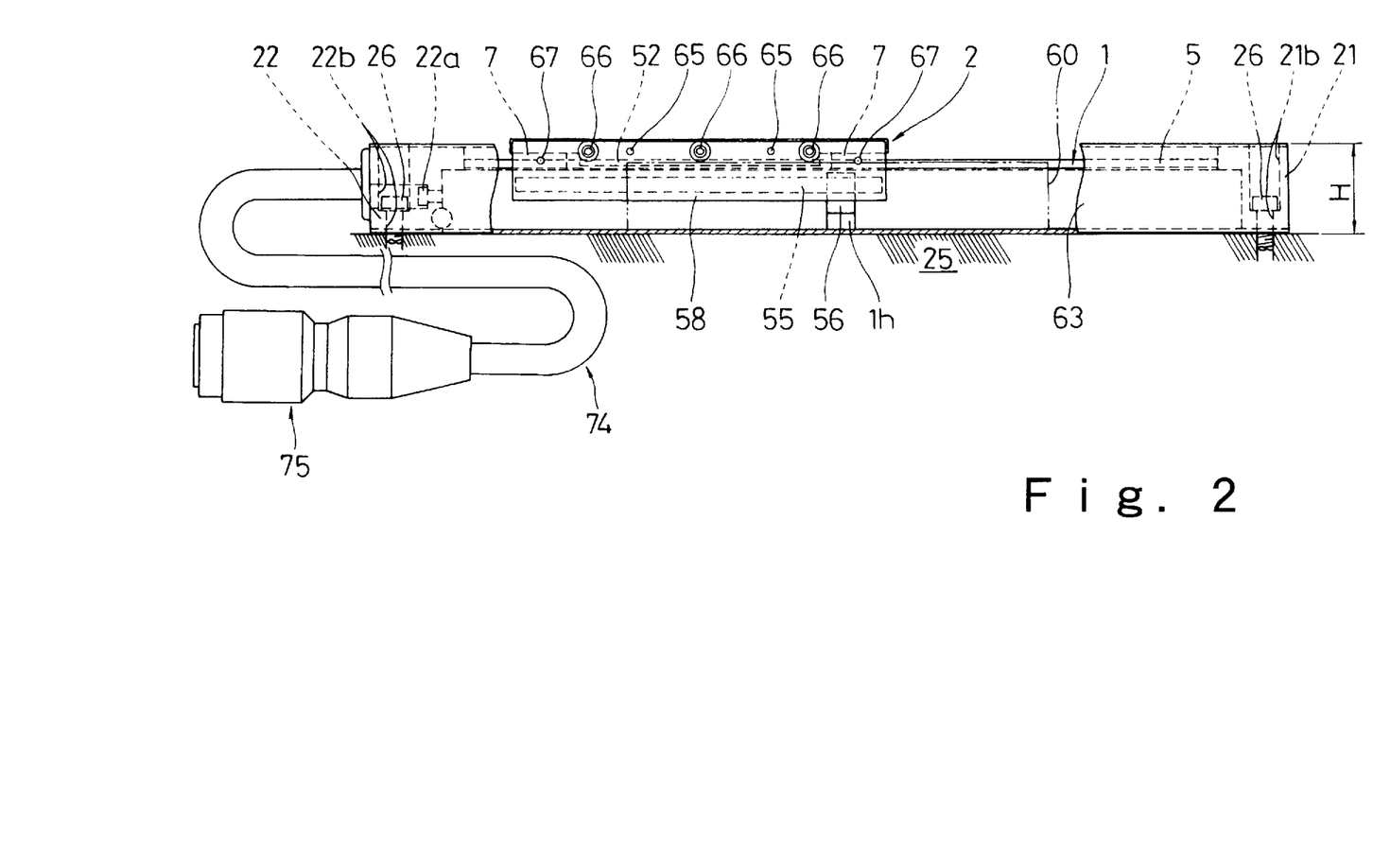
FIG. 2 is a front view, including a partial cross-section, of the small linear motor table shown in FIG. 1.
Figure 3:
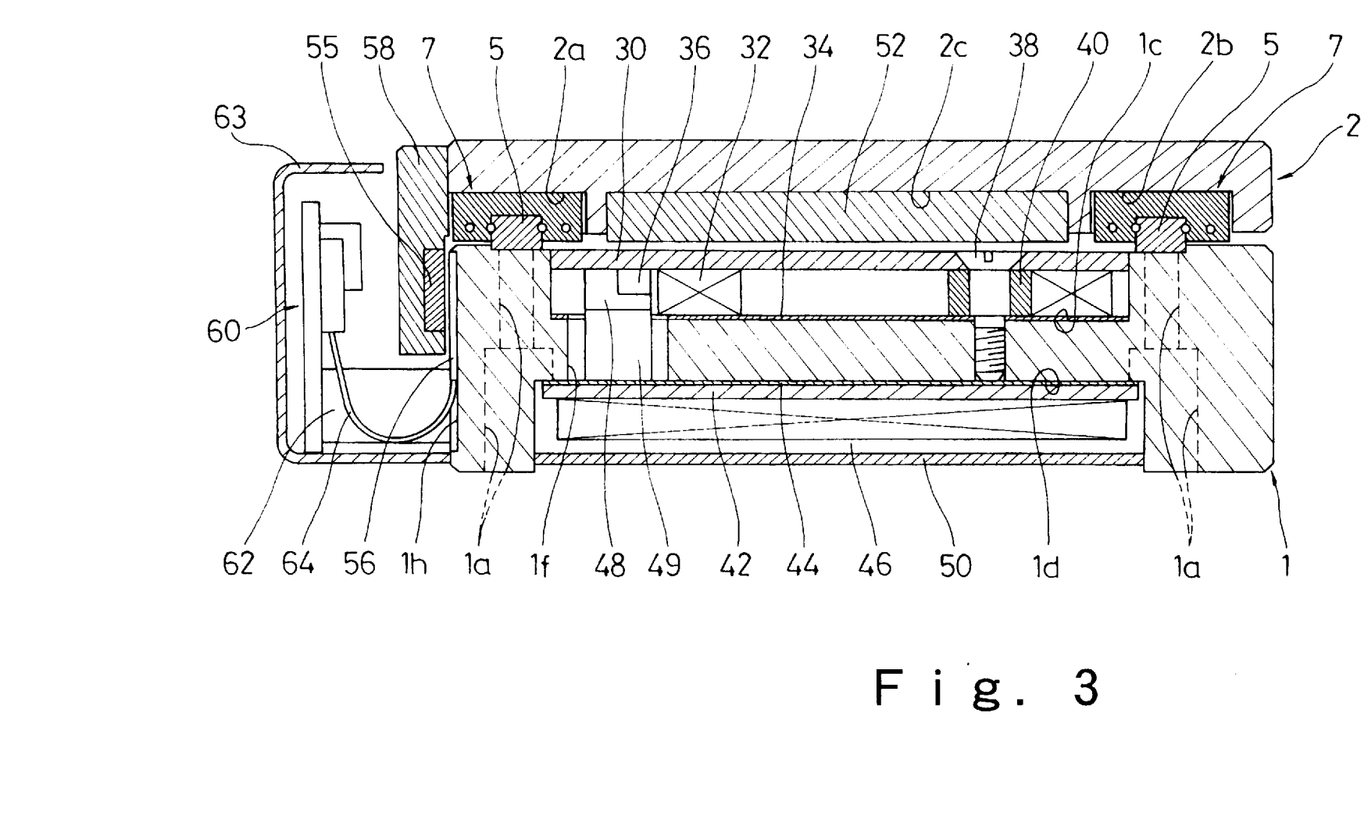
FIG. 3 is a cross-sectional view taken along I—I relating to FIG. 1.

FIGS. 1 through 3 show a small linear motor table as a first embodiment of the present invention (hereinafter to simply be referred to as a linear motor table). The dimensions indicated by reference symbols L, W and H in FIGS. 1 and 2, namely the length, width and height of the main body of said linear motor table, are set at 200 mm, 60 mm and 20 mm, respectively.

Said linear motor table has a long bed 1 for the stationary side, and table 2 provided so as to reciprocate linearly in the lengthwise direction of said bed 1. The length and width of table 2 are 80 mm and 50 mm, respectively, and the operating stroke is set at 60 mm. Namely, in this embodiment, the operating stroke is shorter than the length of table 2. As shown in FIG. 1, threaded holes 2d, for example 4, are formed in the upper surface of table 2 for fastening some type of object. Said table 2 is guided relative to bed 1 by a guiding device having the constitution described below.

Namely, two track members in the form of track rails 5 are arranged along the lengthwise direction of said bed 1 in both sides of the upper surface of said bed 1. These track rails 5 are fastened to said bed 1 by bolts (not shown) inserted into bolt insertion holes 1a (see FIG. 3) formed in the bottom surface of bed 1.

Two sliders each in the form of slide units 7 are provided on both of the above-mentioned track rails 5. These four slide units 7 are inserted into depressions 2a and 2b (see FIG. 3) formed in the four corners of the lower surface of table 2, and are fastened to said table 2 by two bolts 8 (with hexagon heads) each (see FIG. 3). However, bolts 8, including their heads, are embedded in bolt insertion holes formed in table 2 so that they do not protrude from the upper surface of said table 2.

Figure 4:
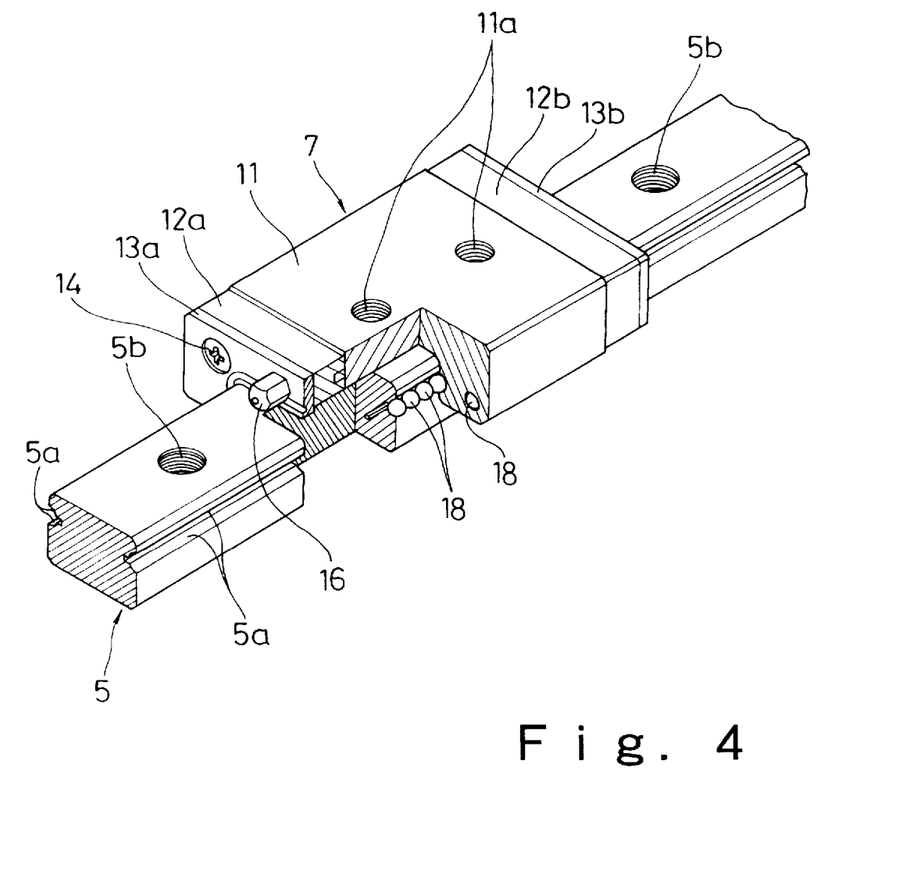
FIG. 4 is a perspective view, including a partial cross-section, of a track rail and slide unit equipped on the small linear motor table shown in FIGS. 1 through 3.

As shown in FIG. 4, one track each in the form of track grooves 5a are formed along the lengthwise direction in the left and right sides of the above-mentioned track rails 5. In addition, threaded holes 5b, in which bolts for fastening to the above-mentioned bed 1 are screwed, are formed at equal intervals in the same direction.

On the other hand, the above-mentioned slide units 7 are riding on track rails 5, and have casing 11, a pair of end caps 12a and 12b engaged on both ends in the direction of progress of said casing 11, and seals 13a and 13b attached each outer surface of both of said end caps 12a and 12b. These end caps and seals are fastened together to casing 11 by screws 14.

Furthermore, threaded holes 11a into which bolts 8 shown in FIG. 1 are screwed are formed in said casing 11. In addition, grease nipple 16 is attached to one of the end caps 12a.

Rolling element circulating paths corresponding to each of the two track grooves 5a provided in track rails 5 are formed in slide unit 7, and a plurality of rolling elements in the form of balls 18 are arranged and contained within said rolling element circulating paths. More specifically, each said rolling element circulating path is composed of a load bearing track groove and return path that are respectively formed linearly and mutually in parallel in the above-mentioned casing 11, and a pair of semi-circular direction changing paths respectively formed in both end caps 12a and 12b that connect said load bearing track groove and return path. Said load bearing track grooves oppose track grooves 5a of track rails 5.

In the above-mentioned constitution, balls 18 receive the load between track rails 5 and slide units 7 by circulating while rolling over track grooves 5a of track rails 5 accompanying movement of slide units 7. As a result, table 2 moves and is guided smoothly.

In the guiding device of the above-mentioned constitution employed in said linear motor table, a preliminary pressure between the above-mentioned track rails 5, slide units 7 and balls 18 is already provided before arrangement of said guiding device. There is no need to adjust this preliminary pressure after arrangement, and there is hardly any risk of this preliminary pressure falling during use. Accordingly, there is no occurrence whatsoever of play or rattling between bed 1 and table 2 between which said guiding device is installed, thus enabling movement of table 2 to be performed with high accuracy.

As shown in FIGS. 1 and 2, end block 21 and connector block 22 are provided on both ends in the lengthwise direction of the above-mentioned bed 1, and are fastened to bed 1 by attachment bolts (with hexagon heads) 21a and 22a. Said end block 21 and connector block 22 have the function of restricting members that restrict the movement of the above-mentioned table 2 so that it does not deviate significantly from its operating stroke.

As shown in the drawings, bolt insertion holes 21b and 22b are formed in each corner of the above-mentioned end block 21 and connector block 22. As shown in FIG. 2, said linear motor table is arranged on work bench 25 of a machine tool and so forth, and is fastened to said work bench 25 by bolts (with hexagon heads) 26 that are inserted into said bolt insertion holes 21b and 22b.

Namely, in addition to their inherent restricting function, the above-mentioned end block 21 and connector block 22 also have the function of a fixing portion that fix said linear motor table to the above-mentioned work bench 25. Thus, the number of parts of said linear motor table are reduced, thereby achieving reduced size and cost, by having one member have two functions.

In addition, the size of said linear motor table, and particularly the dimension of width, is reduced by arranging bolt insertion holes 21b and 22b, into which the above-imentioned bolts 26 are inserted for fixing said linear motor table, in the corners of end block 21 and connector block 22.

This being the case, the case of forming these bolt insertion holes 21b and 22b at locations other than those described above, for example in bed 1, should be considered for the sake of comparison. In other words, since the above-mentioned track rails 5 as well as the coil substrate and armature coils to be described later are arranged on the upper surface of said bed 1, bolt insertion holes must be formed at locations away from this coil substrate and so forth in order to fasten the above-mentioned bolts 26. Since said coil substrate and so forth extend over roughly the entire length of bed 1, the width of bed 1 must inevitably be made bigger to secure adequate two-dimensional space for forming bolt insertion holes, thus leading to increased size of the linear motor table.

In the linear motor table of the present embodiment, in addition to reduced size being achieved by providing the above-mentioned bolt insertion holes 21b and 22b in end block 22, when changing the length of the bed in the production process of bed 1, accommodations can be made easily since bolt insertion holes 21b and 22b are not present in said bed.

Next, the following provides an explanation of the linear electromagnetic actuator that provides driving force between the above-mentioned bed 1 and table 2.

Furthermore, in the case of the present embodiment, although the linear electromagnetic actuator provided is a moving magnet type of linear direct current motor, various other types of actuators can also be applied, including a moving coil type of linear director current motor, linear pulse motor or voice coil motor.

To begin with, an explanation is provided of the primary side of said moving magnet type of linear direct current motor, namely the power supply side.

This primary side has coil substrate 30 shown in FIGS. 1 and 3, and, for example 8, armature coils 32 affixed in a row along the direction of movement of the above-mentioned table 2 on the lower side of said coil substrate 30. As shown in FIG. 3, recess 1c is formed in the upper surface of bed 1 extending over its entire length in the lengthwise direction. Coil substrate 30 and armature coils 32 are arranged within this recess 1c. However, insulating sheet 34 is juxtapositioned between the bottom surface of said recess 1c and armature coils 32 to electrically insulate them.

Figure 5:
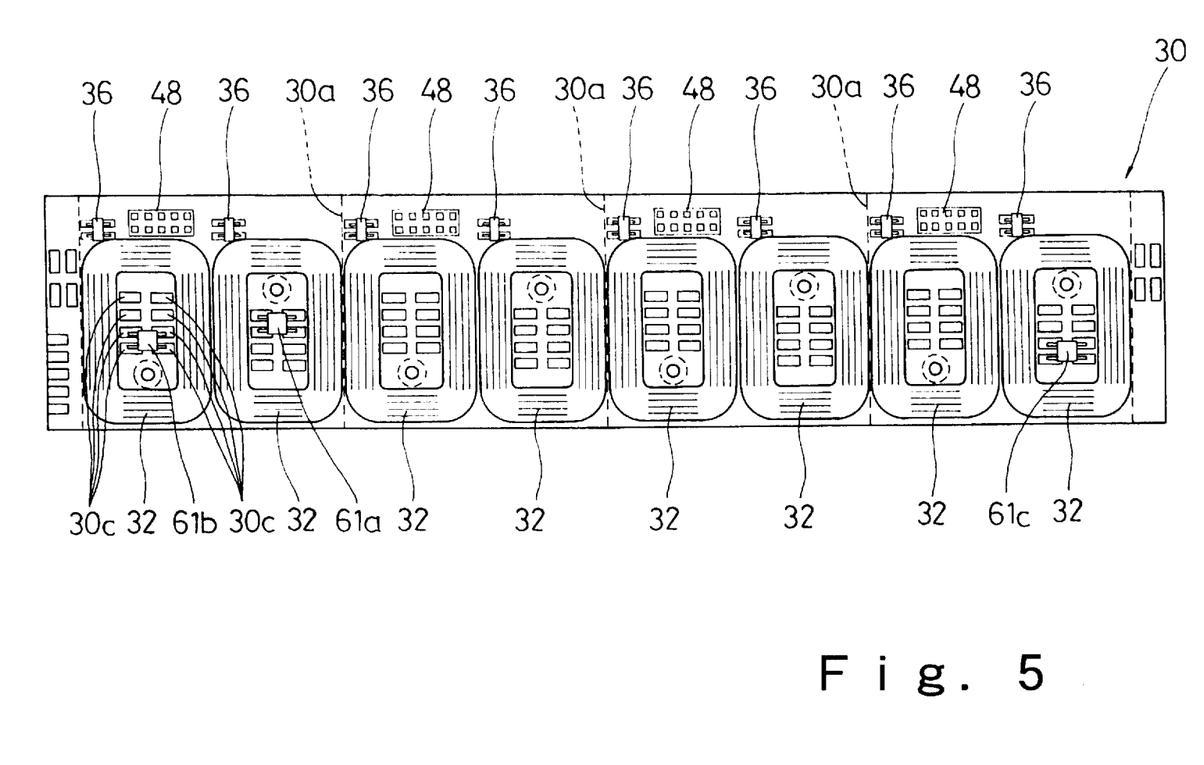
FIG. 5 is a bottom view of a coil substrate equipped on the small linear motor table shown in FIGS. 1 through 3.

FIG. 5 shows the state of the above-mentioned coil substrate 30 as viewed from below. As can be seen from FIGS. 5, 1 and 3, Hall effect elements 36 are provided corresponding to each armature coil 32 on the lower surface of said coil substrate 30. These Hall effect elements 36 emit a signal corresponding to the amount of lines of magnetic force emitted by a field magnet on the secondary side of the linear direct current motor (to be described later) when said field magnet approaches. The supply of power and its interruption is therefore controlled for each of the above-mentioned armature coils 32 based on this signal.

Each above-mentioned armature coil 32 and coil substrate 30 are fastened together to bed 1 by countersunk head screws 38 inserted into each of said armature coils 32. As is clear from FIG. 1, one of each of said countersunk head screws 38 is arranged for each armature coil 32 so that they are mutually offset. They are arranged in this manner because it was found that two screws are sufficient for securing one block since said coil substrate 30 forms a single block with two armature coils as will be described later, and in order to disperse tightening force two-dimensionally.

In the prior art, a single armature coil is fastened with two screws. However, since a single armature coil is able to be fastened and secured in position by a single screw as described above, a large amount of space can be secured on coil substrate 30, and the number of screws and assembly steps are able to be reduced.

As shown in FIG. 3, spacer 40 is fit on the above-mentioned countersunk head screw 38 between coil substrate 30 and bed 1. This spacer 40 is provided to prevent warping and other deformation of coil substrate 30 caused by tightening countersunk head screw 38.

As shown in FIG. 3, recess 1d, similar to upper recess 1c, is formed in the lower surface of bed 1. Drive substrate 42 is provided within this recess 1d, and fastened to bed 1 by screws not shown. However, insulating sheet 44 is provided between the bottom (top) of said recess 1d and drive substrate 42 that electrically insulates them.

Drive substrate 42 is for supplying power and so forth to each of the above-mentioned armature coils 32, and is provided with drive circuit 46 (see FIG. 3) that is composed of various electronic components and so forth.

Here, an explanation is provided of the separating constitution of the above-mentioned coil substrate 30 and drive substrate 42.

As shown with broken lines 30a in FIG. 5, coil substrate 30 is divided into four sections containing eight armature coils 32 in a row, with each block, or unit, containing 2 armature coils. Although not shown in the drawing, drive substrate 42 is similarly divided into four sections corresponding two armature coils 32 each grouped into units together with the above-mentioned drive circuit 46.

In the case of fabricating the above-mentioned coil substrate 30 and drive substrate 42, two base substrates (not shown) are made available having their respective basic lengths. These base substrates consist, for example, of seven of the above-mentioned sections connected to each other. Since the above-mentioned coil substrate 30 and drive substrate 42 must connect four of these sections, three of the seven sections possessed by said base substrate are cut off and separated.

Furthermore, although coil substrate 30 and drive substrate 42 are divided into individual units consisting of two armature coils 32 and a drive circuit for driving them in the present embodiment, these may be divided into units each having three or more armature coils and their drive circuits.

In addition, although coil substrate 30 and drive substrate 42 are obtained by cutting away three sections from the above-mentioned base substrate in the present embodiment, in the case the base substrate alone is not enough for the operating stroke of the linear motor table to be fabricated, the base substrate is suitably cut and joined to an unseparated base substrate.

In this way, a substrate of desired length can be obtained by suitably cutting away portions or joining portions of base substrates.

As shown in FIG. 3, coil substrate 30 and drive substrate 42, arranged to be separated from each other with bed 1 in between, are connected by female and male connectors 48 and 49. Female connectors 48 are shown in FIGS. 1 and 5. One each of these connectors 48 and 49 are arranged for each section provided with two armature coils 32 and its drive circuit grouped into individual units, and are connected through holes 1f formed in bed 1 as shown in FIG. 3.

In addition, as shown in FIG. 3, cover 50 is provided that covers recess 1d of bed 1 in which the above-mentioned drive substrate 42 is inserted. Drive substrate 42 may also be used as a cover without providing cover 50. In other words, in FIG. 3, cover 50 is removed and drive substrate 42 is vertically inverted so that drive circuit 46 is facing upward. In this case, aluminum or iron should be used for the material of drive substrate 42 instead of ordinary epoxy resin to give it strength as a cover. However, insulation measures must be taken due to the presence of drive circuit 46 and so forth.

On the other hand, the secondary side of the linear direct current motor is composed in the manner described below.

As shown in FIGS. 1 through 3, field magnet 52 is affixed to the lower surface of table 2, and this field magnet 52 is the secondary side. As shown in FIG. 3, recess 2c is formed in the lower surface of table 2, and field magnet 52 fits into this recess 2c.

Figure 6:
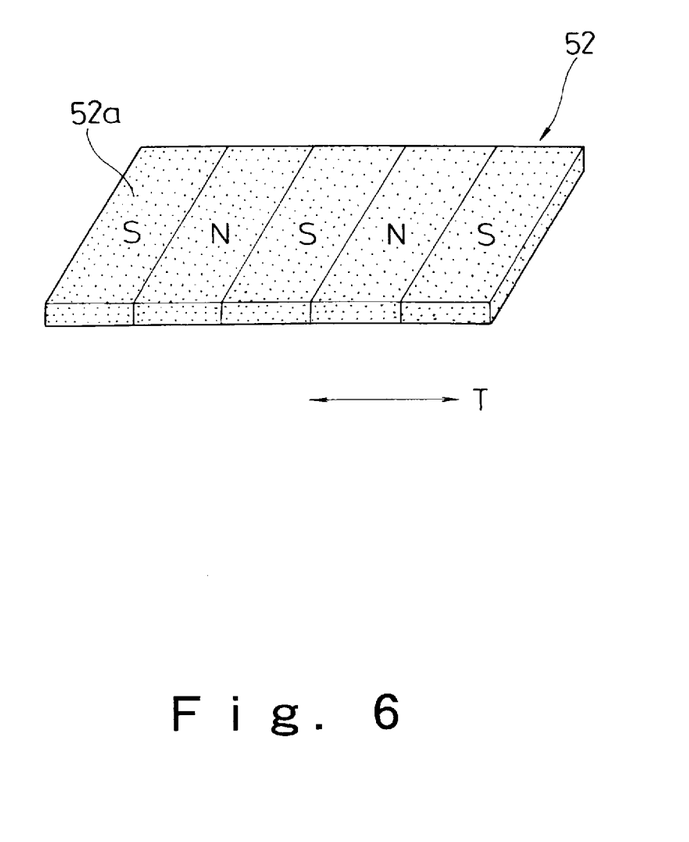
FIG. 6 is a perspective view of a field magnet on the secondary side of a linear direct current motor equipped on the small linear motor table shown in FIGS. 1 through 3.

As shown in FIG. 6, field magnet 52 is formed into the shape of a rectangular plate, and is magnetized so that a plurality, in this case 5, of N and S magnetic poles are alternately arranged along direction T of the reciprocating motion of table 2. In a linear direct current motor having this constitution, thrust is generated based on Fleming's left hand rule between the primary and secondary sides as a result of supplying a prescribed current to armature coils 32, resulting in movement of table 2 integrated into a single unit with the secondary side, namely field magnet 52.

The above-mentioned table 2 on which field magnet 52 is installed is composed of a magnetic material such as steel, and composes a magnetic circuit portion by acting as a magnet yoke.

On the other hand, bed 1 is also made of a magnetic material and acts as a yoke relating to each armature coil 32, namely a coil yoke, thereby composing a magnetic circuit portion. In said linear motor table, bed 1 and table 2 also act as magnetic current portions of a linear direct current motor as described above in addition to their inherent function.

Thus, since it is not necessary to separately provide a coil yoke and magnet yoke, which are relatively large members, there are fewer parts, the size of the apparatus is reduced and the cost is lowered, thus contributing to reduced size and cost of an industrial robot and so forth in which said linear motor table is to be incorporated.

Furthermore, although bed 1 and table 2 both serve as yokes in the present embodiment, only one may be used as a yoke as well.

In said linear motor table, a detection device having the constitution described below is used to detect the relative positions of the above-mentioned bed 1 and table 2.

Namely, the above-mentioned detection device is composed of a detected portion in the form of linear scale 55 and a detecting portion in the form of sensor 56 shown in FIGS. 1 through 3. As shown in FIGS. 2 and 3, said sensor 56 is embedded in recess 1h formed in the side of bed 1, while linear scale 55 is installed by means of scale mounting plate 58 on the side of table 2.

Figure 7:
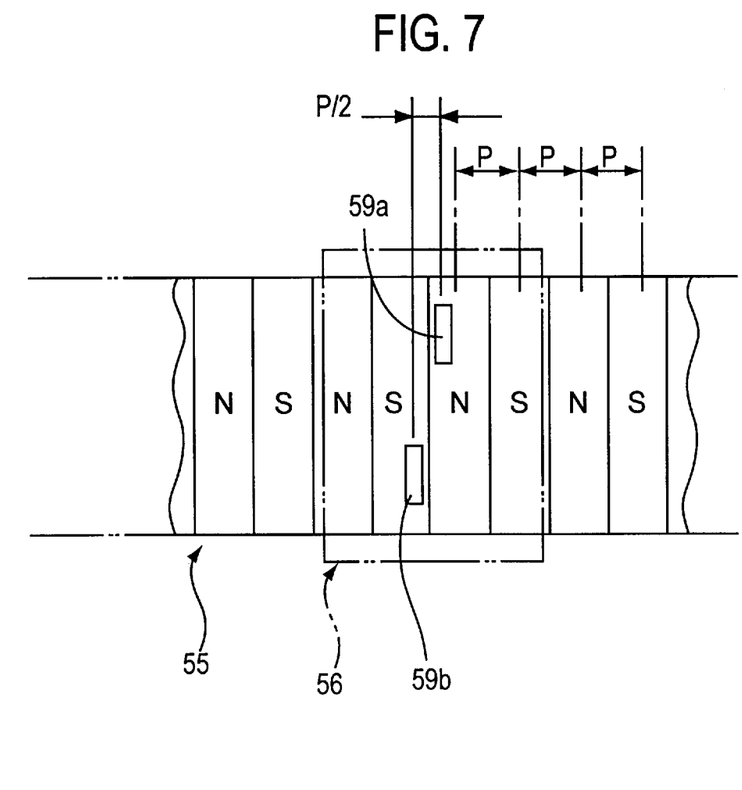
FIG. 7 is an enlarged view of the essential portion of a linear scale and sensor equipped on the small linear motor table shown in FIGS. 1 through 3.

The above-mentioned linear scale 55 is composed of a magnetic scale extending in the direction of movement of table 2 and magnetized by a plurality of N and S magnetic poles alternating at a fine pitch along its lengthwise direction as shown in FIG. 7. In said linear motor table, said linear scale 55 is provided on the moving side and moreover, is protected by being installed on the inside of scale mounting plate 58. According to this constitution, linear scale 55 is not affected by external magnetic fields, resulting in high reliability. More specifically, in the case of apparatuses of the prior art in which the linear magnetic scale is arranged on the stationary side and not protected in any way, there is the risk of a slight disturbance in the magnetic state even if a magnetized screwdriver came in contact or approached said magnetic scale.

As shown in FIG. 7, two Hall effect elements 59a and 59b for phases A and B are positioned on sensor 56 mutually offset by ½ of the above-mentioned pitch relative to linear scale 55. As a result of this constitution, signals of phases A and B are obtained, enabling detection of relative position and discrimination of the direction of movement.

As shown in FIGS. 1 through 3, sensor substrate 60 is arranged to the outside of the above-mentioned linear scale 55 and sensor 56, and said sensor substrate 60 is fastened by bolts (not shown) to the side of bed 1 by means of stud 62 (see FIG. 3). A circuit is incorporated on this sensor substrate 60 for supply of electrical power to the above-mentioned sensor 56 and for amplification and so forth of signals sent out from said sensor 56. This circuit and sensor 56 are connected by flexible substrate 64 shown in FIG. 3, and receiving of signals and so forth is performed through this flexible substrate 64.

The above-mentioned detection device is provided with the following constitution in order to detect that bed 1 and table 2 have reached the reference position of relative motion.

Namely, Hall effect element 61a (magnetic resistance element or MR element) shown in FIGS. 1 and 5 is provided as a detection element for this detection. As can be seen from FIG. 5, this Hall effect element 61a is arranged in the internal space of, for example, the second armature coil 32 from the left end among 8 armature coils 32 equipped on the primary side of the linear direct current motor, and is affixed to coil substrate 30. Magnetic pole 52a on the left end of field magnet 52 (see FIG. 6) functioning as the secondary side acts as the detected element that is detected by said Hall effect element 61a. Hall effect element 61a senses this magnetic pole 52a and emits a signal which then serves as the reference position signal.

In addition, as shown in FIGS. 1 and 5, two Hall effect elements (magnetic resistance elements or MR elements) 61b and 61c are provided as limit sensors that emit a signal after detecting that the above-mentioned table 2 has deviated from its operating stroke. These Hall effect elements 61b and 61c are arranged in the armature coils 32 located on the left and right ends of the above-mentioned 8 armature coils 32, and are installed on coil substrate 30. When table 2 deviates from its operating stroke, the magnetic poles on the left and right ends of field magnet 52 are detected resulting in the emission of a signal.

The following provides an explanation of the arrangement of connection terminals provided on coil substrate 30 for connecting each of the above-mentioned Hall effect elements 61a through 61c.

As shown in FIG. 5, a plurality, for example 8, of connection terminals 30c are provided on coil substrate 30 so as to be located inside each armature coil 32. Since there are, for example, four terminals for each Hall effect element 61a, 61b and 61c, they should be connected by selecting 4 of the 8 connection terminals 30c. As a result, the arrangement positions of said Hall effect elements can be suitably changed.

In addition, since these 8 connection terminals 30c are provided corresponding to each of the 8 armature coils 32, the positions of each Hall effect element 61a, 61b and 61c can be changed in the direction in which each of armature coils 32 is arranged in a row.

As shown in FIGS. 1 through 3, cover 63 is installed on the side of bed 1 over its entire length. This cover 63 protects the above-mentioned sensor substrate 60 and circuit, while also preventing the entry of dust and debris into the space between linear scale 55 and sensor 56.

As has been described above, in said linear motor table, a detecting portion in the form of sensor 56 is installed on bed 1 on the stationary side with respect to the detection device for detecting the relative positions of bed 1 and table 2. In this constitution, flexible substrate 64 for removing the signals and so forth from said sensor 56 is fixed.

In addition, with respect to the previously described linear direct current motor as well, the primary side at which power is supplied is fixed on bed 1, and the cable for supplying electrical power to said primary side is also fixed.

In other words, there are no cables whatsoever connected to table 2 serving as the moving side, thus preventing any dragging of cable and so forth. Accordingly, no matter how fast table 2 is operated, and even if operated for a long time, there is no risk of breakage of said cable and so forth, resulting in a high degree of reliability. In addition, since there is also no generation of dust caused by dragging of the cable and so forth, it is suitable for use in a clean environment.

In addition, since the cable and so forth has no affect on the operation of table 2, it is effective with respect to conditions of use consisting of a small stroke, rapid operation and high reciprocating frequency that are required by small positioning tables.

However, in said linear motor table, a gap adjustment device is provided that adjusts the gap between the above-mentioned linear scale 55 and sensor 56 provided for detection of the relative positions of bed and 1 and table 2. This gap adjustment device is composed in the manner described below.

Namely, as shown in FIG. 2, although scale locking plate 58 in which linear scale 55 is installed in its lower end is positioned by interior pins 65 at its upper end and fastened to table 2 by bolts (with hexagonal heads) 66, it contains gap adjustment screw 67 that is screwed into it slightly lower than said bolts 66. The end of this gap adjustment screw makes contact with table 2. In other words, after tightening bolts 66 loosely so as to tentatively lock scale locking plate 58 in position and suitably turning gap adjustment screw 67 to adjust the gap between linear scale 55 and sensor 56, bolts 66 are completely tightened to lock in position.

Thus, as a result of performing gap adjustment, even if there is a slight amount of assembly error between each member, in addition to being able to prevent linear scale 55 and sensor 56 from making contact, the gap between the two can be set to a constant amount enabling accurate and reliable detection.

Furthermore, the above-mentioned gap adjustment device has an extremely simple constitution, is inexpensive and is compact in size.

Continuing, the following provides an explanation of the state of the connections between the main body of said linear motor table and a controller (not shown) that governs operational control of said linear motor.

With respect to said main body, the above-mentioned coil substrate 30 and drive substrate 42 should be connected with the above-mentioned controller. Sensor substrate 60 is wired (not shown) to said drive substrate 42 which also serves as the connection between said drive substrate 42 and the controller.

Figure 8:
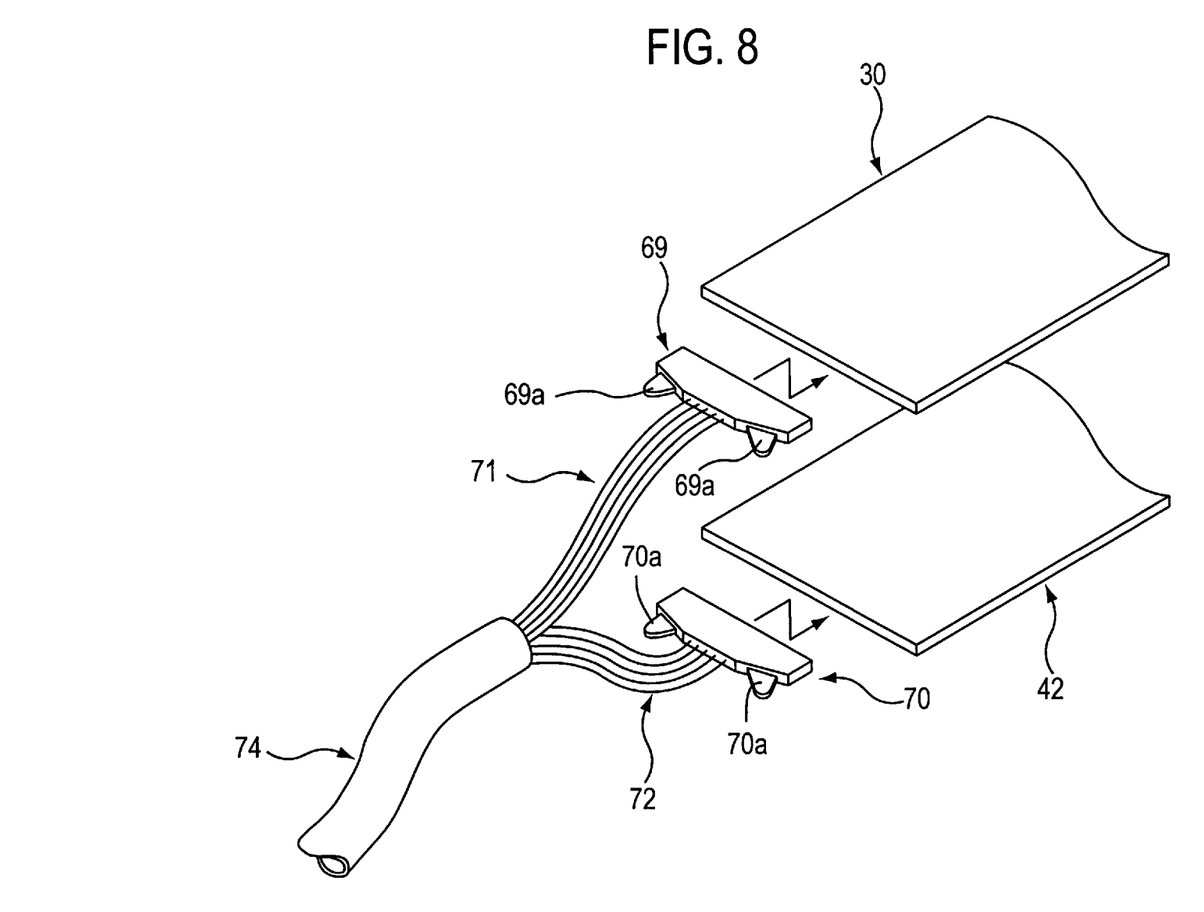
FIG. 8 is a perspective view showing a cable connected to the coil substrate and to drive substrate equipped on the small linear motor table shown in FIGS. 1 through 3.

As shown in FIG. 8, the required number of cables 71 and 72 are connected to the circuits respectively provided on coil substrate 30 and drive substrate 42 by means of connectors 69 and 70. These connectors 69 and 70 can be connected and fixed to coil substrate 30 and drive substrate 42 simply with a one-touch operation, and can be easily disconnected by operating lock release levers 69a and 70a with which they are equipped. However, each cable 71 and 72 may be connected directly to the respective circuits of coil substrate 30 and drive substrate 42 by soldering and so forth without using these connectors 69 and 70.

Each of the above-mentioned cables 71 and 72 are further provided with a covering and gathered into a single cable 74. These gathered cable 71 and 72 are contained within connector block 22 shown in FIGS. 1 and 2. As shown in FIGS. 1 and 2, connector 75 is provided on the end of this cable 74, and said connector 75 is connected to the above-mentioned controller.

In this way, in said linear motor table, the supplying of electrical power and so forth to the linear direct current motor, sensor 56 and so forth is led to the outside after being centralized at a single location. Thus, there are no errors in wiring, the apparatus can be handled easily, and there is less susceptibility to broken wires.

The signals emitted from each of the above-mentioned Hall effect elements 59a, 59b (see FIG. 7), 61a, 61b and 61c (shown in FIGS. 1 and 5) are sent to the above-mentioned controller via the above-mentioned cable 74, where operation control is performed by said controller in the following manner based on these signals.

When an operation command is emitted from the above-mentioned controller as a result of an operator operating an operating switch and so forth, the initial operation consists of table 2, which had been stopped at an arbitrary position, being moved towards the reference position established on one end of its operating stroke, in this case on the left end in FIGS. 1 and 2. When table 2 reaches the reference position, scale position data stored in memory (RAM) is reset corresponding to the reference position signal emitted as a result of Hall effect element 61a shown in FIGS. 1 and 5 sensing end magnetic pole 52a (see FIG. 6) of field magnet 52.

As a result of this reset command, table 2 begins to move towards the desired position. Accompanying this movement, continuous waveforms having different phases for which the level has been amplified are obtained from the above-mentioned Hall effect elements 59a and 59b (see FIG. 7). The controller discriminates the direction of movement of table 2 by comparing these waveforms.

In addition, the amount of movement of table 2 from the reference position is obtained by counting the number of pulses obtained in accordance to the number of fine magnetic poles of linear scale 55 from the above-mentioned Hall effect element 59a or 59b.

Continuing, the following provides an explanation of a small linear motor table as a second embodiment of the present invention that demonstrates effects similar to the above-mentioned first embodiment based on FIGS. 9 through 12. However, since this linear motor table of the second embodiment is composed in the same manner as the above-mentioned first embodiment with the exception of the portions explained below, an overall explanation will be omitted to avoid duplication, and the explanation will only focus on the essential portion.

In addition, in the following explanation and FIGS. 9 through 12, the same reference numerals will be used as in the above-mentioned first embodiment for those constituents of the second embodiment that are either identical or correspond to the constituents of the first embodiment.

Figure 9:
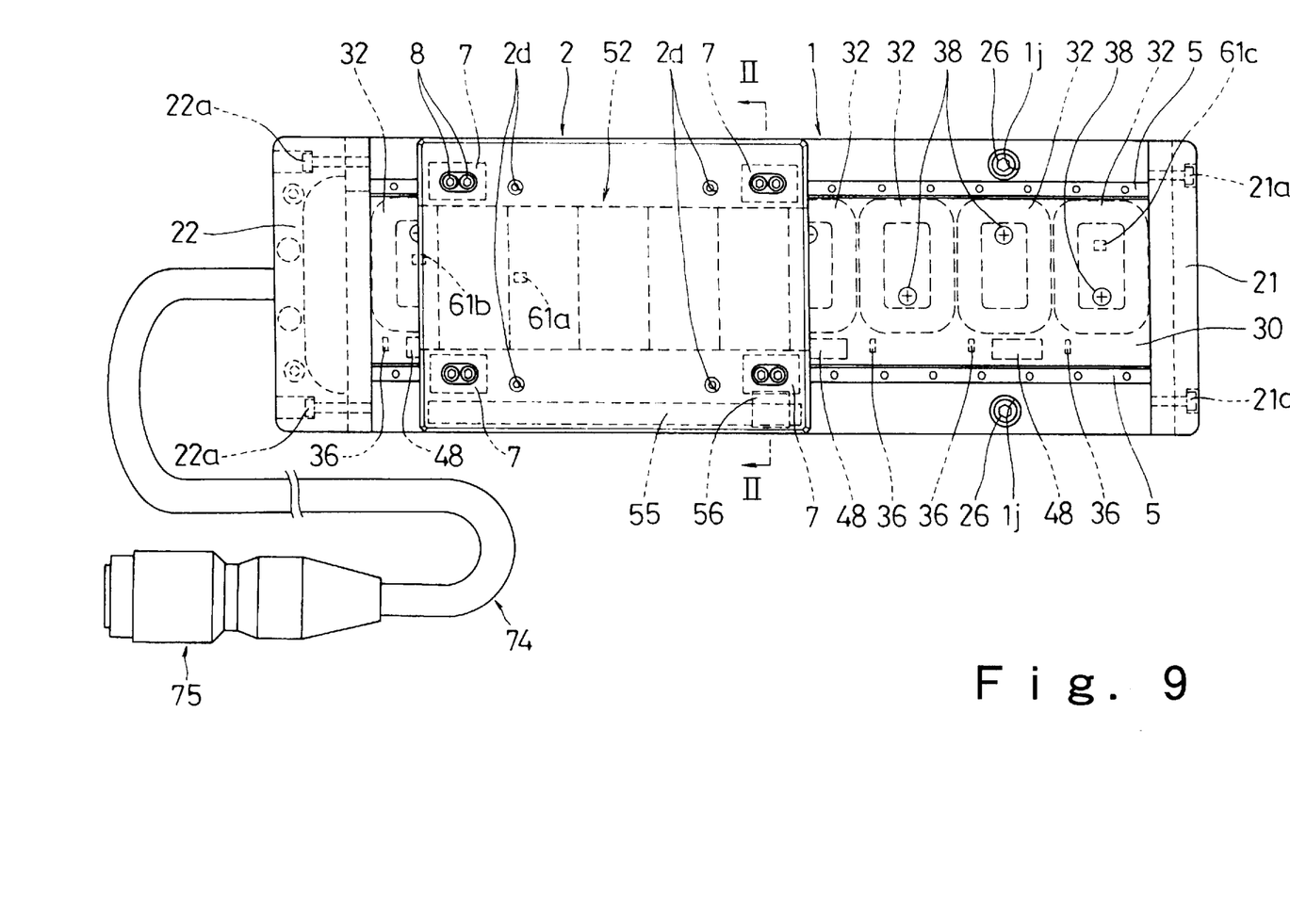
FIG. 9 is an overhead view of a small linear motor table as a second embodiment of the present invention.
Figure 10:
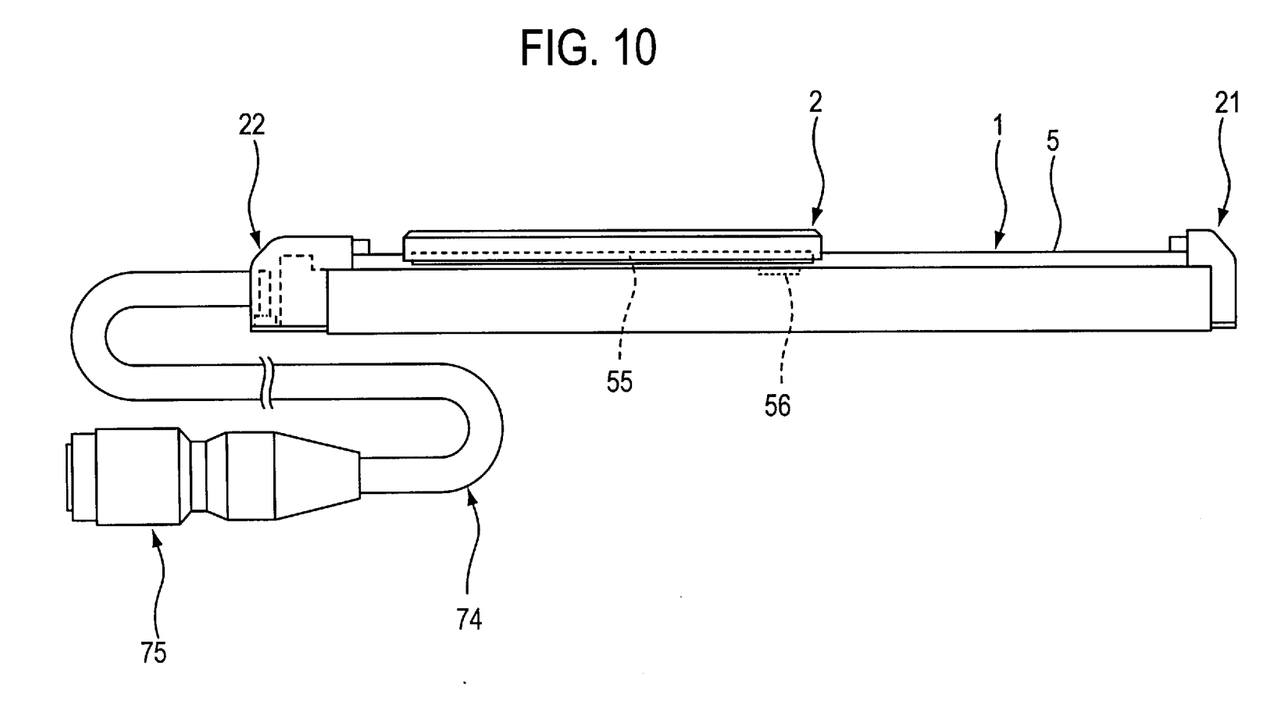
FIG. 10 is a front view of the small linear motor table shown in FIG. 9.
Figure 11:
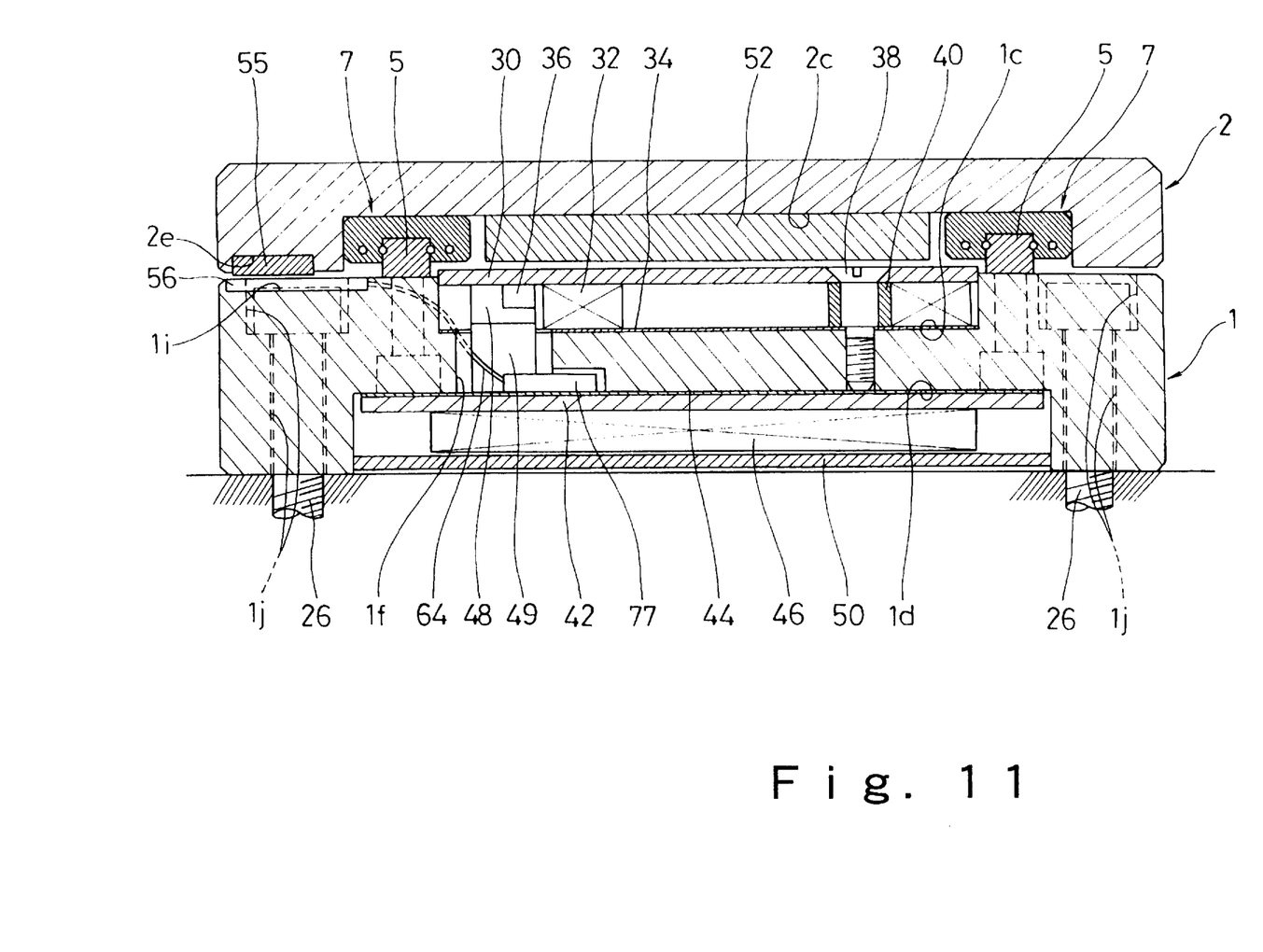
FIG. 11 is a cross-sectional view taken along II—II relating to FIG. 9.

As shown in FIGS. 9 through 11, in this second embodiment, linear scale 55 and sensor 56 for detecting the relative positions of bed 1 and table 2 are arranged on mutually opposing portions of said bed 1 and table 2. More specifically, linear scale 55 is embedded in recess 2e formed in the bottom on one side of table 2, while sensor 56 is embedded in recess 1i formed in bed 1 corresponding to said recess 2e.

In this constitution, the main body of table 2 also serves as the attaching portion of linear scale 55. In addition, linear scale 55 and sensor 56 are protected by bed 1 and table 2, thus eliminating the need for the scale locking plate 58 provided in the above-mentioned first embodiment. Accordingly, the width of said linear motor table can be made to be less than that of the first embodiment. Conversely, if both are made to have the same width, other components such as armature coils 32 or field magnet 52 can be made larger, thus enabling the driving force and so forth to be increased.

In addition, in said linear motor table, sensor substrate 60 for sensor 56 provided in the above-mentioned first embodiment is not provided, while the following constitution is employed in its place.

Figure 12:
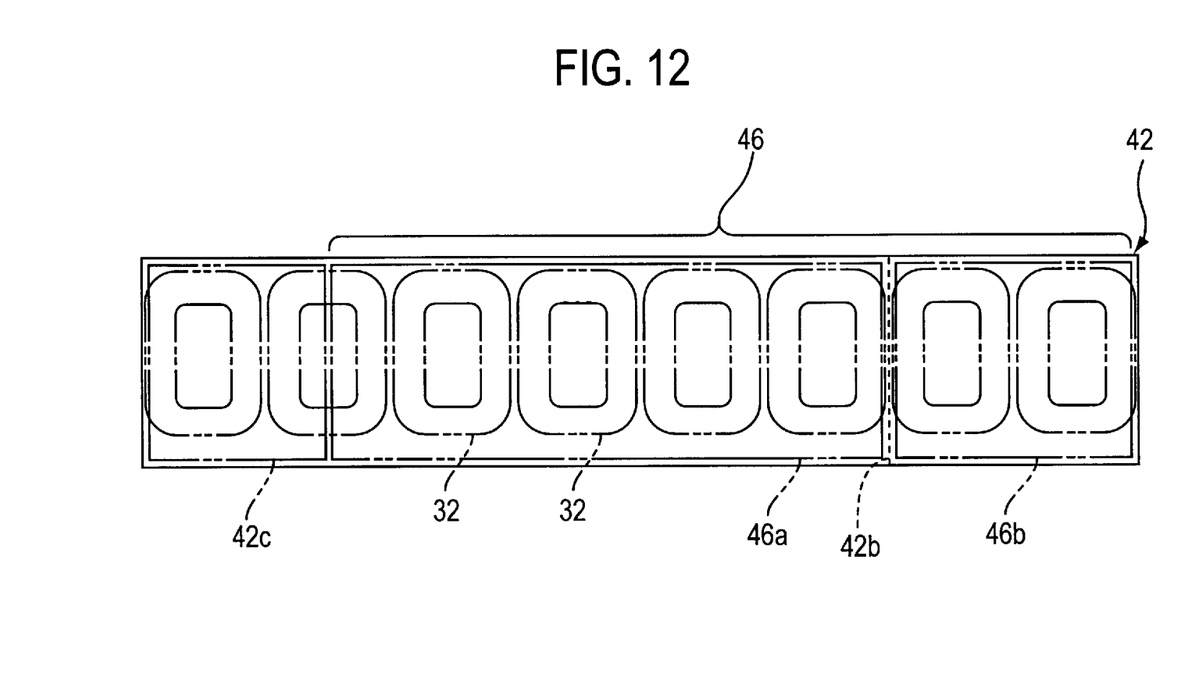
FIG. 12 is an overhead view schematically illustrating the correspondence between a drive substrate and armature coils equipped on the small linear motor table shown in FIGS. 9 through 11.

Namely, as shown in FIG. 12, drive circuit 46 on drive substrate 42 is compactly concentrated into circuit portion 46a, which corresponds to six armature coils 32 in common, and circuit portion 46b, which corresponds to the remaining two armature coils 32. The smaller of the two, circuit portion 46b, is removed in the case the operating stroke of the linear motor table is even shorter, and is separated at broken line 42b.

As a result of making drive circuit 46 more compact as described above, empty space 42c is provided in one end of drive substrate 42. A circuit for amplifying signals sent from the above-mentioned sensor 56 is incorporated in this empty space 42c. As shown in FIG. 11, this sensor circuit is connected with sensor 56 by connector 77 and flexible substrate 64.

As a result of employing the above-mentioned constitution, in addition to the above-mentioned sensor substrate 60 no longer being necessary, large cover 63 provided in the first embodiment to protect said sensor substrate 60 and so forth is also unnecessary. For this reason, the width of the linear motor table can be made even smaller, and conversely, the size of each component in said direction of width can be increased.

As shown in FIGS. 9 and 11, in said linear motor table, bolt insertion holes 1j, in which are inserted bolts 26 that anchor said linear motor table to work bench 25 (see FIG. 11), are arranged near the side of bed 1. This is made possible as a result of increased dimensions in the direction of width based on the above-mentioned constitution.

Furthermore, the present invention is not limited to the constitutions of both of the above-mentioned embodiments, but rather a diverse range of constitutions can be realized by mutually combining or applying constitutions contained by each of these embodiments.

As has been explained above, in the linear motor table as claimed in the present invention, at least either the bed or table also acts as the magnetic circuit portion of a linear electromagnetic actuator, and more specifically a yoke, in addition to its inherent function.

Thus, since it is not necessary to separately provide a yoke, which is a relatively large member, there are fewer parts, the size of the apparatus is reduced and the cost is lowered, thus contributing to reduced size and cost of an industrial robot and so forth in which said linear motor table is to be incorporated.

In addition, in the above-mentioned linear motor table, the primary side of the linear direct current motor, namely the power supply side, is fixed to the bed of the stationary side. With respect to a detection device for detecting the relative positions of the bed and table, the detecting portion on the power supply side is installed on the bed, while the detected portion is attached to the table.

In other words, there are no cables whatsoever connected to the table serving as the moving side, thus preventing any dragging of cables and so forth. Accordingly, no matter how fast the table is operated, and even if operated for a long time, there is no risk of breakage of said cable resulting in a high degree of reliability. In addition, since there is also no generation of dust caused by dragging of the cable and so forth, it is suitable for use in a clean environment.

In addition, since the cable and so forth has no affect on the operation of the table, it is effective with respect to conditions of use consisting of a small stroke, rapid operation and high reciprocating frequency that are required by small positioning tables.

Next, in the above-mentioned linear motor table, a guiding device is provided that performs relative guidance of the bed and table. Said guiding device is composed of track members in which tracks are formed in the lengthwise direction, sliders riding on said track members in which are formed rolling element circulating paths corresponding to said tracks, and rolling elements arranged and contained within said rolling element circulating paths.

In the guiding device of this constitution, a preliminary pressure is already provided before arrangement of said guiding device between the above-mentioned, track rails, sliders and rolling elements. There is no need to adjust this preliminary pressure after arrangement, and there is hardly any risk of this preliminary pressure falling during use. Accordingly, there is no occurrence whatsoever of play or rattling between the bed and table between which said guiding device is installed, thus enabling movement of the table to be performed with high accuracy.

In addition, in the above-mentioned linear motor table, restricting members are provided on both ends of the bed that restrict the movement of the table, while also serving as locking portions that secure said linear motor table to a workbench and so forth. As a result of having a single member perform the two functions of restricting movement and fixing in position, the number of parts of said linear motor table are reduced, thereby achieving reduced size and cost.

What is claimed is:

1. A small linear motor table comprising:
   a bed and a table incorporated so as to freely and mutually perform relative motion;
   a linear electromagnetic actuator that provides a driving force between said bed and said table, wherein at least one of said bed and said table is a magnetic circuit portion of said linear electromagnetic actuator;
   a detection device for detecting a relative position of said bed and said table, said detection device comprising a detected portion and a detecting portion; and
   a drive substrate and armature coils and drive circuits provided on said drive substrate, wherein said drive substrate comprises at least two sections, plural ones of said armature coils and at least one of said drive circuits together forming a single unit provided on each one of said sections of said drive substrate, and a length of said drive substrate being changed by adding or removing one or more of said sections, wherein
   an empty space is provided at a predetermined location on said drive substrate, and wherein said detecting portion comprises an electrical circuit, said electrical circuit being provided in said empty space.

2. A small linear motor table comprising:
   a bed and a table incorporated so as to freely and mutually perform relative motion;
   a linear electromagnetic actuator that provides driving force between said bed and said table, wherein at least one of said bed and said table is a magnetic circuit portion of said linear electromagnetic actuator, wherein said linear electromagnetic actuator comprises a linear direct current motor having an armature coil group and a field magnet, a primary side of said motor being fixed to said bed;
   a detection device for detecting relative positions of said bed and said table, said detection device comprising a detected portion attached to said table and a detecting portion provided on said bed; and
   a gap adjustment device that adjusts a gap between said detecting portion and said detected portion.

3. A small linear motor table comprising:
   a bed and a table incorporated so as to freely and mutually perform relative motion;
   a linear electromagnetic actuator that provides driving force between said bed and said table, wherein at least one of said bed and said table is a magnetic circuit portion of said linear electromagnetic actuator; and
   a drive substrate and armature coils and drive circuits provided on said drive substrate, wherein said drive substrate comprises at least two sections, plural ones of said armature coils and at least one of said drive circuits together forming a single unit provided on each one of said sections of said drive substrate, and a length of said drive substrate being changed by adding or removing one or more of said sections, wherein said drive substrate is a cover member.

4. A small linear motor table comprising:

a rectangular plate-like bed and a linearly reciprocating rectangular plate-like table, which are mutually incorporated so as to freely perform relative longitudinal motion;

a guiding device which is provided in said bed and said table and performs a relative guidance of said bed and said table, said guiding device comprising a track rail which is provided along the longitudinal direction thereof and is formed with tracks, a slide unit which is formed with rolling element circulating paths corresponding to said tracks and rides on said track rail, and rolling elements which are arranged and contained in said rolling element circulating paths;

a linear electromagnetic actuator comprising a linear direct current motor which has a primary side in which a drive substrate for supplying power to an armature coil group and to each armature coil of said group is fixed to said bed, and a secondary side in which a field magnet is fixed to said table; and a detection device for detecting a relative position of said bed and said table, said detection device comprising a detected portion which functions as a linear scale and is attached to a table side, and a detecting portion which functions as a sensor corresponding to said linear scale and is attached to a bed side, at least one of said bed and said table being made of a magnetic material, and being a magnetic circuit portion of said linear electromagnetic actuator which functions as a magnetic yoke or coil yoke.

5. A small linear motor table as set forth in claim 4, wherein said bed is provided with restricting members which restrict movement of said table, at both ends thereof, and said restricting members are formed with a bolt insertion hole for fixing a position of said restricting members.

6. A small linear motor table as set forth in claim 4, further comprising a cable for supplying power to said linear direct current motor and to said detecting portion, said cable being centralized at a single location, and being led to the outside from a connector block situated on an end of said bed.

7. A small linear motor table as set forth in claim 4, wherein said armature coil and drive circuits provided on said drive substrate are integrated as a single unit and a plurality of units are arranged in series, and said drive substrate is capable of being divided into each said unit.

8. A small linear motor table as set forth in claim 4, wherein an empty space is provided at a predetermined location on said drive substrate, and an electrical circuit of said detecting portion is arranged in said empty space.

9. A small linear motor table as set forth in claim 4, further comprising a gap adjustment device which includes a gap adjustment screw for adjusting a gap between said detecting portion and said detected portion.

10. A small linear motor table as set forth in claim 4, wherein said drive substrate is a cover which closes a recess on a lower surface of said bed.

11. A small linear motor table as set forth in claim 4, wherein said detecting portion and said detected portion are arranged on a lower surface on one side of said table and an upper surface of said bed corresponding to said lower surface on one side of said table, respectively.

* * * * *